(12) United States Patent
Watabe

(10) Patent No.: US 6,747,935 B2
(45) Date of Patent: Jun. 8, 2004

(54) OPTICAL INFORMATION RECORDING AND REPRODUCING DEVICE

(75) Inventor: Teruyasu Watabe, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 279 days.

(21) Appl. No.: 10/101,217

(22) Filed: Mar. 20, 2002

(65) Prior Publication Data

US 2002/0191518 A1 Dec. 19, 2002

(30) Foreign Application Priority Data

Mar. 21, 2001 (JP) ....................... 2001-081151

(51) Int. Cl.[7] ................................ G11B 7/00
(52) U.S. Cl. ............... 369/59.1; 369/59.11; 369/59.26; 369/47.1
(58) Field of Search ............... 369/47.1, 47.11, 369/47.5, 47.51, 53.1, 53.11, 53.37, 59.1, 59.11, 59.12, 59.21, 59.26, 116

(56) References Cited

U.S. PATENT DOCUMENTS 5,777,967 A * 7/1998 Ishibashi et al. ........... 369/59.2
6,493,305 B1 * 12/2002 Hayashi et al. .......... 369/59.12

* cited by examiner

*Primary Examiner*—Muhammad Edun
(74) *Attorney, Agent, or Firm*—Dickstein Shapiro Morin & Oshinsky LLP

(57) ABSTRACT

There are times when an abnormal light emission occurs and damage the medium when updating the setting register of the pulse width or the laser driving current during recording operation in an optical information recording and reproducing device. There are thus provided a plurality of pulse width setting registers for setting the pulse width of the multi-pulse emissions. When updating the pulse width of the multi-pulse, the pulse width setting register is changed and then the recording operation is performed, and at the time to change the pulse width setting register during recording, the generation of recording pulse train is stopped.

9 Claims, 11 Drawing Sheets

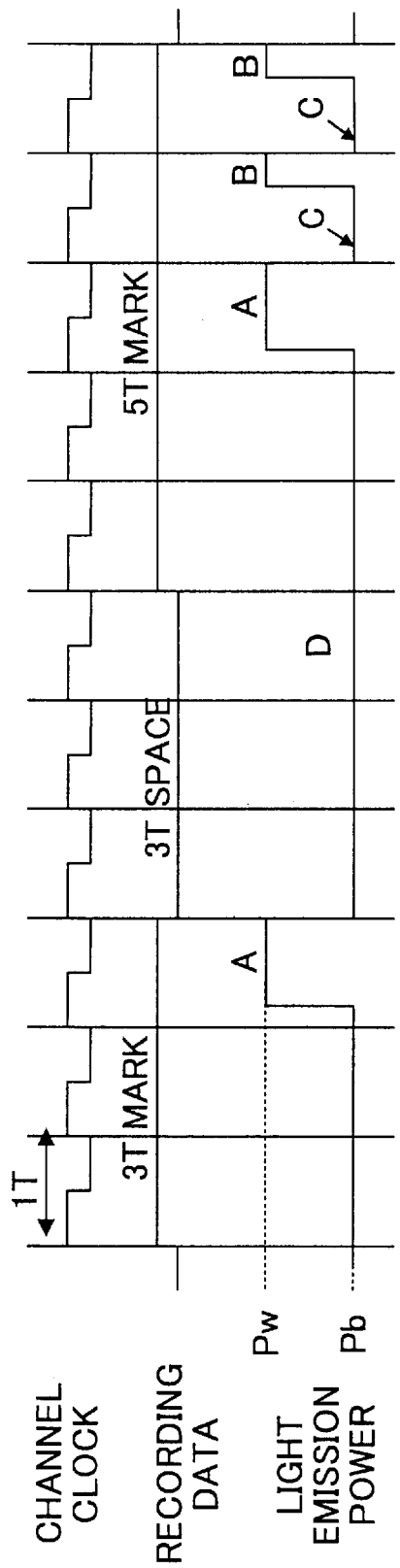

OPTICAL INFORMATION RECORDING AND REPRODUCING DEVICE

This application claims the benefit of a Japanese Patent Application No. 2001-081151 filed Mar. 21, 2001 in the Japanese Patent Office, the disclosure of which is hereby incorporated by reference.

BACKGROUND OF THE INVENTION

1. Field of the Invention

The present invention generally relates to an optical information recording and reproducing device for recording information on a recording medium, for example, an optical disk, with a laser beam generated from a light source.

2. Description of the Related Art

The CDs and CD-ROMs for music, and recently, reproduction-only media (recording medium) such as DVD-ROMs, and information reproducing devices are put to practical use with the spread of multimedia. Furthermore, recently, phase change type media, besides a write once optical disk using pigment media, and an erasable type magneto optical (MO) disk using MO media, have also gained attention, and information recording and reproducing devices utilizing such recording medium are being put to practical use. The erasable type DVD media has become the center of attention as multimedia-recording media and as mass storage media of the next generation.

The phase change type media record information by reversibly phase changing the recording material to a crystal phase and an amorphous phase. Furthermore, the phase change type media can record and reproduce information with only a laser beam generated from a light source, which consists of a semiconductor laser and does not need an external magnetic field as with the MO media. The phase-change media also allow an overwrite recording in which recording and erasing of the information are performed simultaneously by the laser beam.

A semiconductor laser emission waveform of a single pulse generated based on, for example, a 8–16 modulation code is given as a general recording waveform for recording information on phase change type media. However, in a single pulse recording using such recording waveform, problems in that recording marks may produce tear-shaped distortions due to heat reserve, formation of the amorphous phase may be insufficient due to insufficient cooling speed, and recording marks having low reflection to the laser beam may not be obtainable, may arise.

The above problems are prevented by forming marks on the phase change type media using a laser beam of multi-pulse shape, which uses multi-stage recording power, as shown in FIG. 10, as a recording method, in which information is recorded on the phase change type medium of a DVD system. The mark portion of the multi-pulse shape consists of a leading heating pulse A for sufficiently pre-heating the recording film of the phase change type medium to above its melting point, a plurality of trailing consecutive heating pulse B, a consecutive cooling pulse C in between pulse A and pulse B, and a final cooling pulse Cr. If the light emission power (peak power) of the leading heating pulse A and the heating pulse B is referred to as Pw, the light emission power (bias power) of the cooling pulse C and Cr as Pb, and the reproducing power as Pr, respective light emission powers are defined as $$Pw > Pb \approx Pr \tag{1}$$

Furthermore, the space portion of the multi-pulse shape consists of an erasing pulse D and its light emission power (erase power) Pe is defined as $$Pw > Pe > Pb \tag{2}$$

In this way, by assuming the recording waveform as the multi-pulse light emitting waveform, an amorphous phase is formed during the mark portion of the phase change type medium because of the quenching condition of heating→cooling by the heating pulse A, B, and the cooling pulse C, Cr. On the other hand, a crystal phase is formed during the space portion because of the slow cooling condition of only heating with the erasing pulse D. Thus, a sufficient difference in reflectance is obtained between the amorphous phase and the crystal phase.

Moreover, when recording information on a pigment medium of the DVD system, recording marks cannot be produced due to heat reserve in the single pulse recording, and thus, a recording method of forming marks with a laser beam having a multi-pulse shape as shown in FIG. 11 is proposed. In FIG. 11, if the light emission power (peak power) of the leading heating pulse A and the heating pulse B is referred to as Pw, the light emission power (bias power) of the cooling pulse C and the space portion D as Pb, and the reproducing power as Pr, respective light emission powers are defined as $$Pw > Pb \approx Pr \tag{3}$$

In the early stages of CD-ROM or DVD-ROM, a CLV (Constant Linear Velocity) type method enabling large storage capacity had been common as a velocity control method of a spindle motor, but in order to make the rotational speed of the spindle motor faster to increase the information transfer speed, it became necessary to simplify the control of the motor, and thus a CAV (Constant Angular Velocity) control type method, in which the angular speed of rotation is constant, became effective.

Since the CD media, and the DVD media have the same information recording density throughout the entire region on the assumption that both media are reproduced in the CLV type method, when recording of CAV type recording is carried out to a media of such structure, the linear velocity of recording (recording linear velocity) is faster towards the outer circumference. Accordingly, when recording is carried out with the same optical pulse emission for both the inner and the outer circumference, the laser power may become insufficient on the side of the outer circumference. Furthermore, when recording using a medium optimized for CLV recording, a good recording cannot be performed if the linear velocity is too fast or too slow, and malfunctions resulting in deterioration of overwrite properties and increase of jitters may occur.

In order to solve such problems, pulses having a slightly shorter input pulses are emitted instead of the multi-pulse if the relative speed of the information recording medium and the laser beam is faster as disclosed in, for example, Japanese Laid-Open Patent Application No. 6-12674. Furthermore, in a Japanese Laid-Open Patent Application No. 5-274678, if the laser beam is irradiated to a region on the outer circumference side, the duty ratio of the pulse emission is larger than that in irradiating a region on the inner circumference side.

Since pulse widths are set according to the radial position and the recording linear velocity as shown in the conventional art, in for example, Japanese Patent No. 02982556, a register is provided for correcting pulse widths, and the light emitting pulse shape is determined based on the value of this pulse width setting register in a pulse shape generating circuit. The value of the register may be varied according to the radial position or the recording linear velocity.

Furthermore, in a Japanese Laid-Open Patent Application No. 7-272275, two types of PLL clock and laser driving current setting registers are provided as techniques for updating the light emitting level according to the linear velocity; and by selecting the PLL clock and the laser driving current setting register alternately every time a zone is changed, recording may be performed consecutively to different zones.

In the recording operation using the CAV control type method, it is necessary to update the pulse width or the light emitting level registers, but generally, the output values of the registers tend to be in an unsteady state at the instant the contents of the registers are updated, and when at least a pulse is emitted based on a register value at this instant, an abnormal emission such as glitches may occur and damage the medium. Furthermore, if a sequence operation is performed based on the register value when the pulse shape generating circuit generates the pulse shape, the sequence operation may fail if the register value is an abnormal value, and all subsequent generating pulses may become abnormal pulses.

Although the method of alternately changing the registers as described in a Japanese Laid-Open Patent Application No. 7-272275 is effective for solving the above problems, in Japanese Laid-Open Patent Application No. 7-272275, the laser driving current register is changed for every zone and because the boundary of the zones is not a data recording region, the behavior of the light emitting waveform at the instant of change (changing instant) is not particularly considered. When the pulse width setting register or the driving current setting register of the peak level is changed during the period of the multi-pulse emission, an abnormal emission of, for example, glitches may occur at the changing instant.

SUMMARY OF THE INVENTION

The general object of the present invention is to solve the above described problems and prevent abnormal light emission even when the pulse width or laser driving current setting registers are updated during the recording operation, and to prevent the pulse width setting sequence from becoming an abnormal operation and damaging the medium.

The above object of the present invention is achieved in that the optical information recording and reproducing device has a plurality of pulse width setting registers for setting pulse width of the multi-pulse emissions, that the pulse width setting register is changed and then the recording operation is performed when updating the pulse width of multi-pulse emission, and that at a time of changing the pulse width setting register during recording, generation of the recording pulse train is stopped.

The above object of the present invention is further achieved in that a period for stopping the generation of the recording pulse train is during space data recording.

The above object of the present invention is further achieved in that the optical information recording and reproducing device has a plurality of laser driving current setting registers for setting an amount of laser driving current of each light emitting level, and that the laser driving current setting register is changed and then a recording operation is performed when updating the amount of laser driving current, and a time to change the laser driving current setting register for setting the amount of current driven by light emission power for forming mark data is within the space data output period.

The above object of the present invention is further achieved in that the optical information recording and reproducing device has a plurality of laser driving current setting registers for setting an amount of laser driving current of each light emitting level; and that the laser driving current setting register is changed and then recording operation is performed when updating the amount of laser driving current, and a time to change the laser driving current setting register for setting the amount of current driven by light emission power for forming space data is within the mark data output period.

The above object of the present invention is further achieved in that mark/space information is recorded, erased, and reproduced on a phase change type recording medium by laser power of three values of bias level/erase level/peak level.

The above object of the present invention is further achieved in that a time to change the pulse width setting register and/or the laser driving current setting register is during a recording period of longer than a predetermined length.

The above object of the present invention is further achieved in that the pulse width setting register and/or the laser driving setting register is included in a laser driving arrangement for driving the laser.

The above object of the present invention is. further achieved in that the pulse width setting register is set according to a change in the channel clock cycle.

The above object of the present invention is further achieved in that the recording is performed in a CAV control method at a constant rotating angular speed.

BRIEF DESCRIPTION OF THE DRAWINGS

Other objects, features and advantages of the present invention will become more apparent from the following detailed description when read in conjunction with the accompanying drawings, in which:

FIG. 11 is a timing chart showing-the formation of marks by a laser beam of multi-pulse shape.

DETAILED DESCRIPTION OF THE PREFERRED EMBODIMENTS

Embodiment 1

In this embodiment, an example is shown of an information recording method of an optical information recording and reproducing device for recording (overwrite) code data of DVD format on a phase change medium (for example, phase change disk), and mark edge (PWM: Pulse Width Modulation) recording is performed using 8–16 modulation code as a data modulating method. In the present invention, information is recorded by forming recording marks by multi-pulse emitting the semiconductor laser using such medium and recording data.

Figure 1:
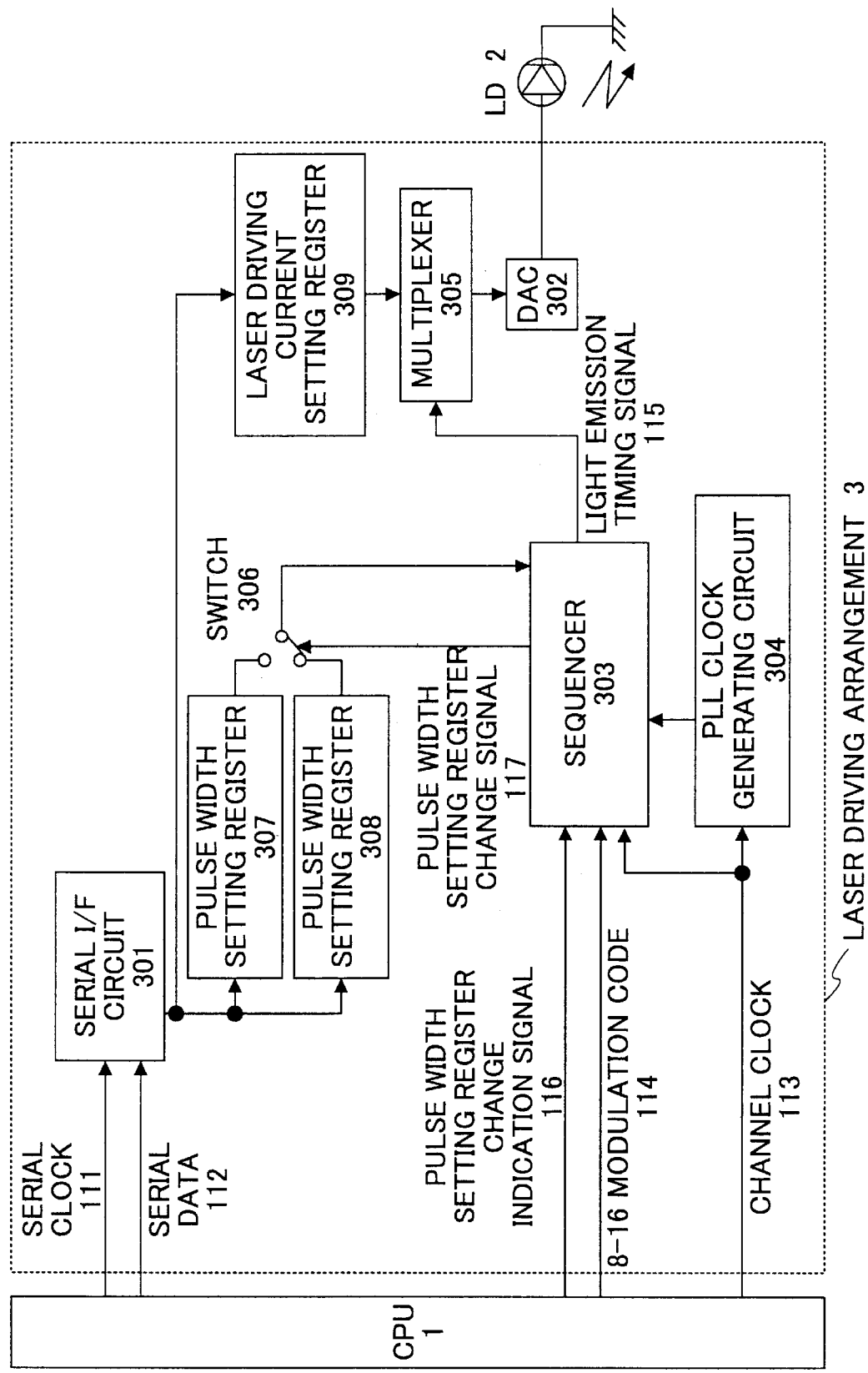
FIG. 1 is a diagram showing a control block of an optical information recording and reproducing device according to a first embodiment of the present invention.
Figure 3:
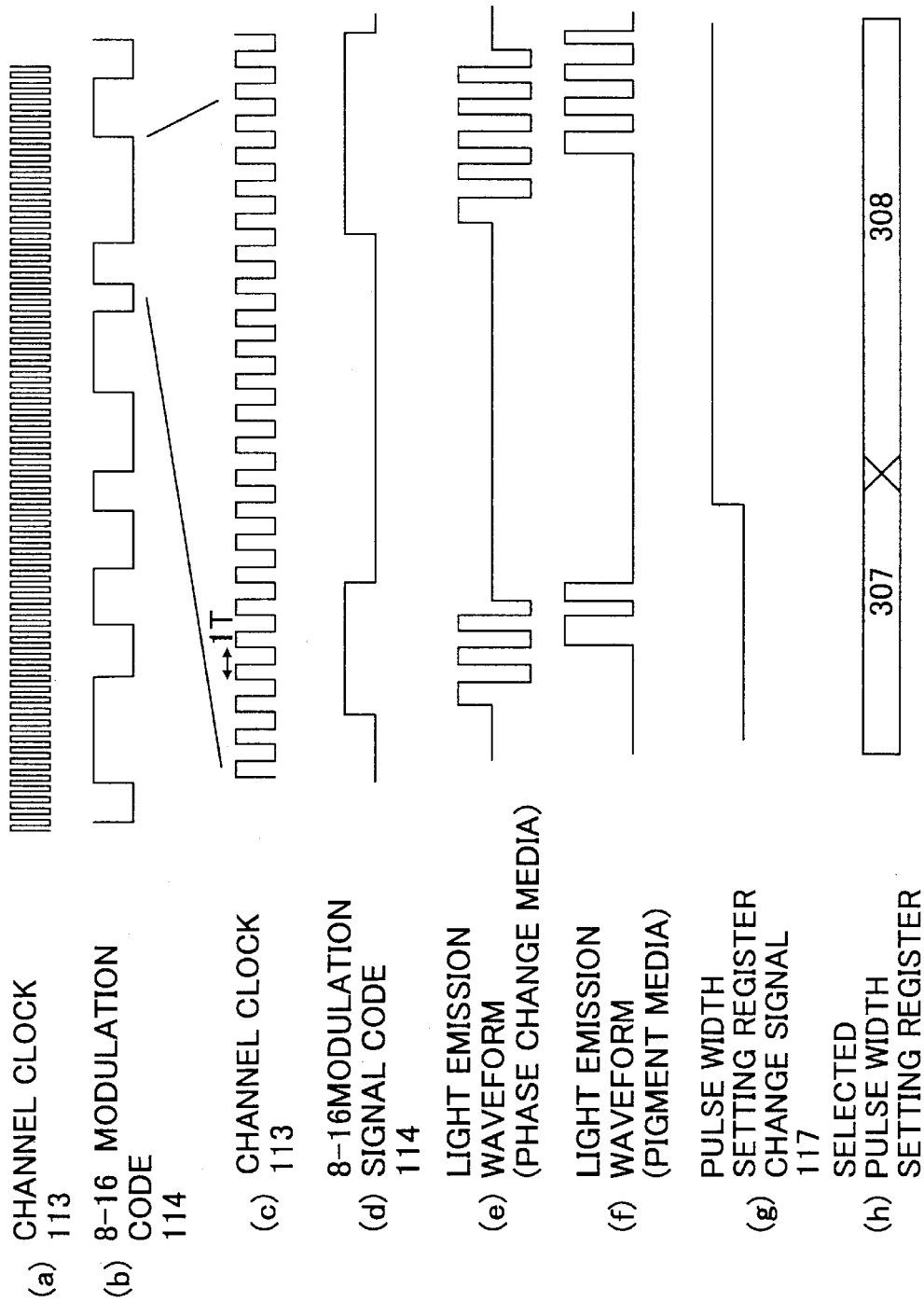
FIG. 3 is a timing chart showing the operation of FIG. 1.

FIG. 1 is a diagram explaining part of a function of an optical information recording and reproducing device. Furthermore, a timing chart for explaining this embodiment is shown in FIG. 3. A laser driving arrangement 3 includes a function for generating multi-pulse, DAC 302 for supplying driving current to LD 2, and a register for storing these set values.

The general laser driving arrangement is arranged in close proximity to a laser and is thus placed on an optical pick up, and is connected with lines via flexible substrate to a device for generating optical pulse shapes. In such construction, the generated pulse shape passes through the long wiring on the flexible substrate and thus, when the channel clock becomes a high-speed clock, it is difficult to accurately transmit the pulse shape. Therefore, in the laser driving arrangement 3, a function for generating and current driving the multi-pulse emission is internally integrated, and the flexible substrate may now be recorded with a high-speed clock by transmitting the channel clock and the 8–16 modulation code.

The light emission power of the laser requires 3 types of recording power; a reproducing power Pr during reproduction, a peak power Pw/bias power Pb for forming marks with multi-pulse during recording, and an erasing power Pe for forming spaces. Depending on the set value of each of these levels, driving current is supplied from the DAC 302 to the LD 2. The setting of the laser driving current for each light emitting level is set at a laser driving current setting register 309 through serial communication from the CPU 1. The set value of the laser driving current corresponding to each light emitting level is respectively stored in the laser driving current setting register 309.

The CPU 1 converts the recording information based on the channel clock cycle T to a 8–16 modulation code 114 as shown in FIG. 5(b), and together with the channel clock pulses 113 outputs it to the laser driving arrangement 3. Within the laser driving arrangement 3, a sequencer 303 generates a multi-pulse shape, and in accordance with such shape determines the light emission timing at the bottom level/erase level/peak level, and outputs the light emission timing signal 115 to a multiplexer 305.

The channel clock pulses 113 are multiplied in the PLL clock generating circuit 304, and are then output to the sequencer 303. In the sequencer 303, a multi-pulse width is set using this multiplied channel clock as the synchronizing clock. For example, if the channel clock frequency is 26 MHz, and the multiplication factor of the PLL is 40, sequencer 303 operates at 26×40=1.04 GH. In the multiplexer 305, the set value of the laser driving current according to each level is read out from the laser driving current setting register 309 at the timing indicated by the light emission timing signal 115, and is output to the DAC 302. The DAC 302 drives the LD 2 with the set current value corresponding to each light emitting level.

Figure 6:
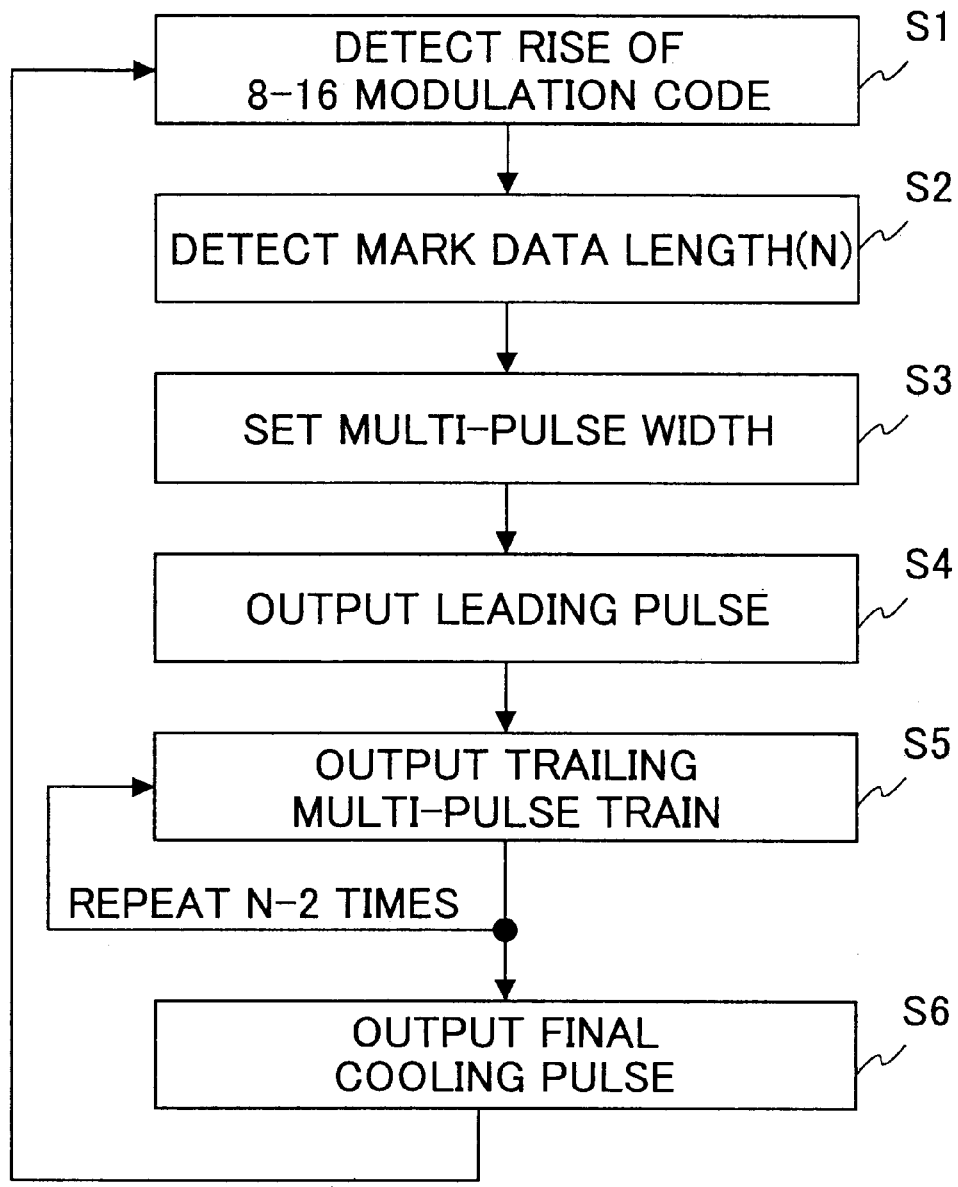
FIG. 6 is a flow chart showing a generating sequence of the multi-pulse shape.

When the driving current flows from the laser driving arrangement 3 to the LD 2, a laser is emitted from the LD 2. The laser irradiates an optical disk, not shown, and records and reproduces information. Sequencer 303, based on the input 8–16 modulation code 114, generates the multi-pulse shape with a sequence as shown in FIG. 6.

When the 8–16 modulation code 114 rises (space data→mark data) (step S1), a mark data length is first detected (step S2). From the detected mark data length, the pulse count, the leading pulse width, the trailing multi-pulse width, and the final cooling pulse width are determined (step 3). Here, each pulse width is set with the resolution of PLL multiplication clock based on the values of the pulse width setting registers 307 and 308. The pulse width setting registers 307 and 308 are set with values from a serial clock 111 and a serial data 112 from the CPU 1 through serial communication.

Sequencer 303 generates an optical pulse shape based on the values of pulse width setting registers 307 and 308. For example, if the pulse count is N−1 for data length of N, the leading pulse is output (step 4), and then the trailing multi-pulse train is output twice (step 5), and finally, the final cooling pulse is output. One multi-pulse generating sequence is now completed (step 6).

Figure 7:
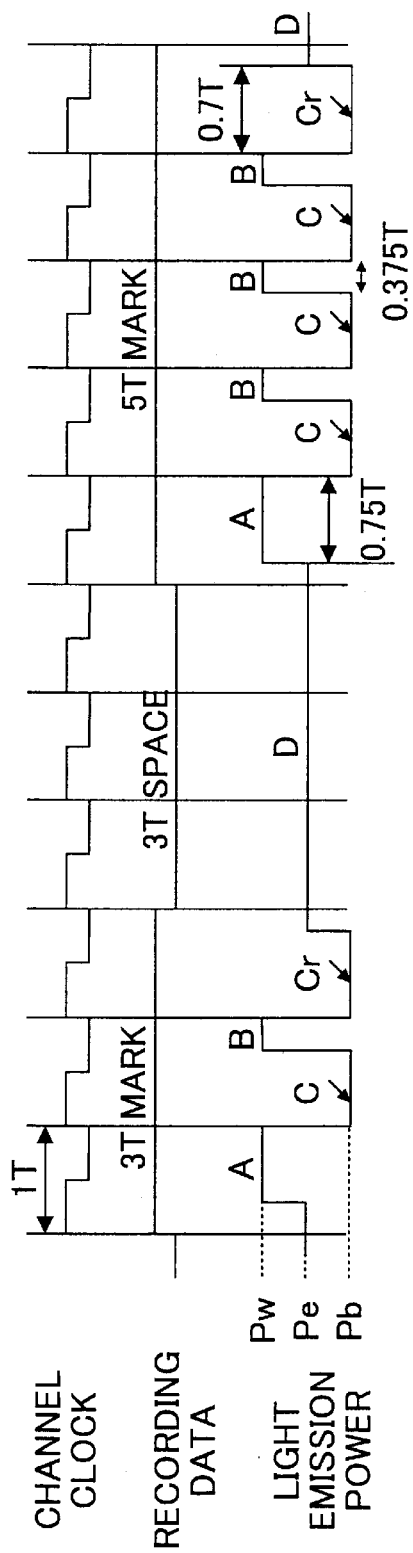
FIG. 7 is a waveform chart showing pulse widths set to an innermost circumference recording.

When recording with CAV method, which rotates the spindle motor at a constant speed of rotation, the channel clock is faster toward the outer circumference side and lack of heat capacity occurs. Thus, as shown in FIG. 7 (at innermost, lowest linear velocity <1T=38ns>) and FIG. 8 (at outermost, highest linear velocity <1T=15ns>), the leading pulse width A and the trailing multi-pulse width B are corrected based on the radial position of the medium. In other words, each pulse width setting is changed from the innermost circumference→outermost circumference, using the channel clock cycle T as reference, in the following manner.

| leading pulse width (A) | 0.75 T → 0.85 T |
| trailing multi-pulse width (B) | 0.375 T → 0.55 T |

Since the asymmetry becomes larger with increase in linear velocity, the final cooling pulse width is changed from the innermost circumference→outermost circumference in the following manner.

final cooling pulse width (Cr):0.7 T→0.375 T

Figure 8:
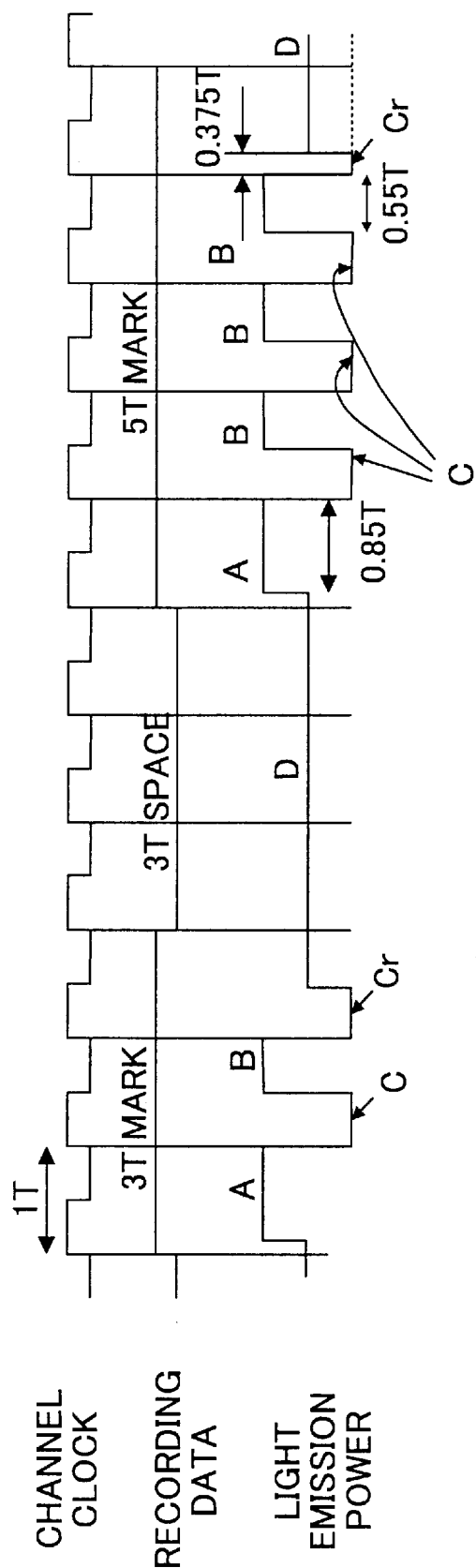
FIG. 8 is a waveform chart showing pulse widths set to an outermost circumference recording.
Figure 9:
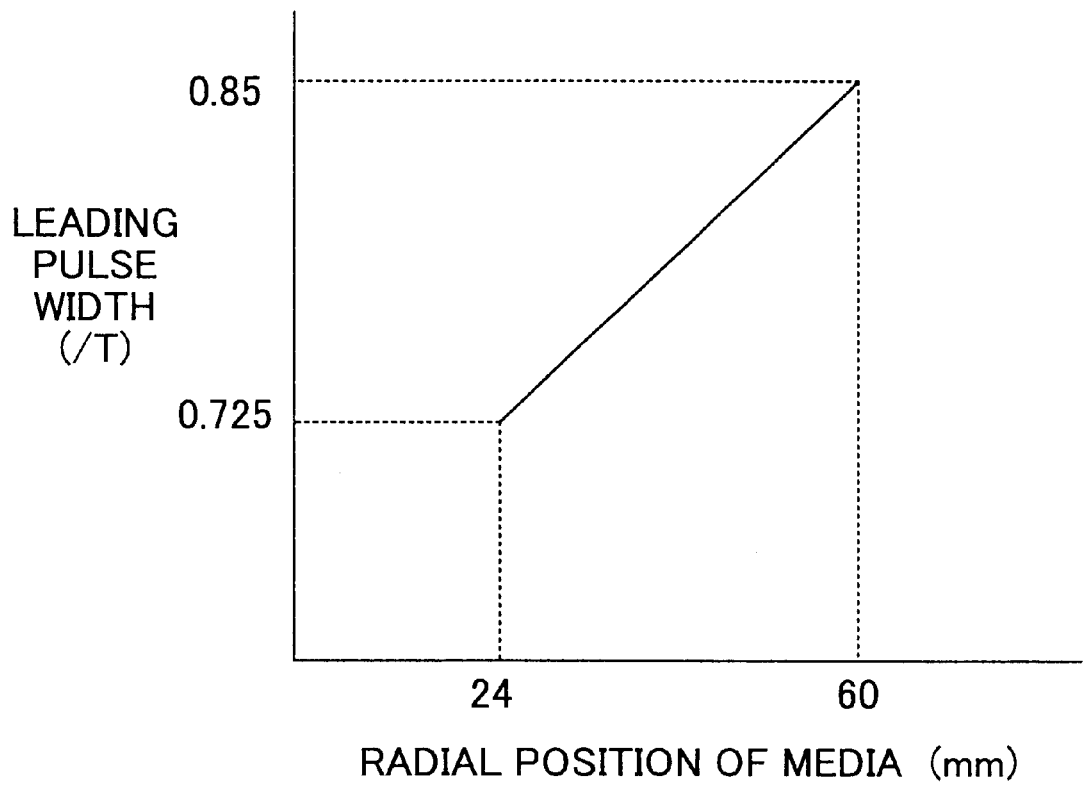
FIG. 9 is a diagram showing pulse width set to a middle radial position.
Figure 10:
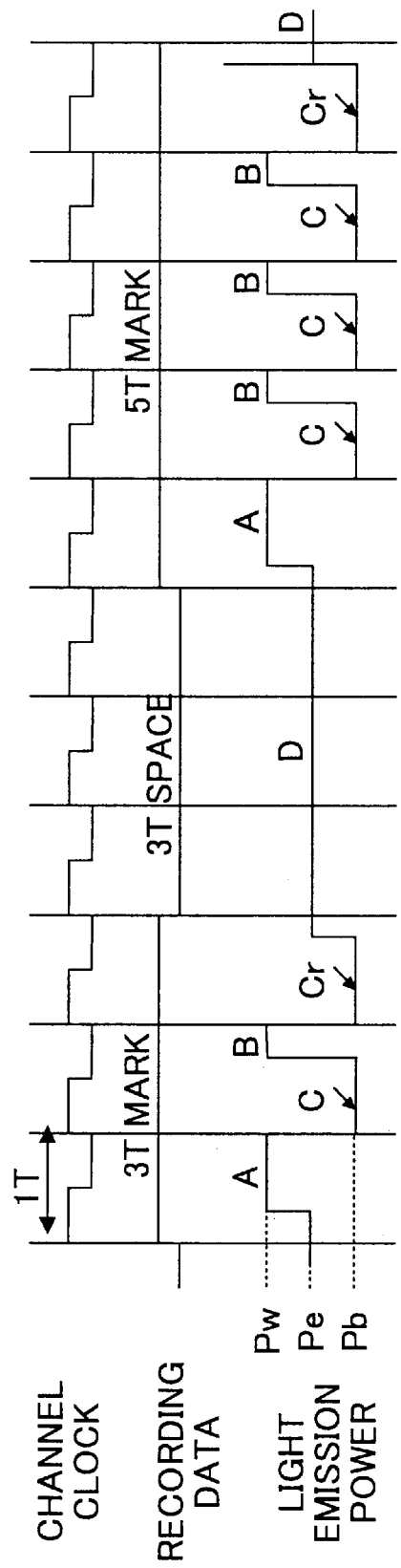
FIG. 10 is a timing chart showing the formation of phase change type media by a laser beam of multi-pulse shape using multi-stage recording power.

FIGS. 7 and 8 show the pulse width setting values during recording of the innermost circumference and of the outermost circumference, respectively. For the midway position of the radial position, a linear prediction is made from the values of the innermost circumference and the outermost circumference as shown in FIG. 9, and then the value is determined. In the CAV type recording, the channel clock at the outermost circumference is about 2.5 times that of the innermost circumference. Therefore, if the channel clock frequency during recording of the innermost circumference is 26 MHz, the channel clock frequency during recording of the outermost circumference is 26×2.5=65 MHz.

In this way, it is necessary to correct the multi-pulse width while recording consecutively when performing the CAV recording. However, as mentioned above, when the pulse width setting register is updated during recording, the output value of the register may have an indefinite value for a moment and may cause glitches in the light emission waveform or cause failure in the sequence operation.

Here, the case in which the sequence fails can be found, for example, when sequencer 303 attempts to carry out an operation to determine the leading pulse width based on the leading pulse rise timing and the leading pulse fall timing stored in the pulse width setting registers, and the leading pulse width fall timing has a faster timing than the leading pulse rise timing. Sequencer 303 generates the pulse shape by sequentially referring to the value of the pulse width setting register, so that if the value of the register is not in the order of the expected size, an abnormal operation of, for example, the sequence operation entering an endless loop, may occur.

In order to avoid such phenomenon, two systems of pulse width setting registers (307,308) are provided. The register being referred to is alternately changed every time the pulse width is updated. Each register updates the register value through serial communication during the non-referring period. Thus, the sequence failure may be prevented but glitches may be produced at the instant of register change.

The present invention, thus, attempts to change the pulse width setting registers 307 and 308 during the long space data output period, as shown in FIG. 3. The data length of the long space data is, for example, 11 T space data, being the longest pattern (excluding the think pattern) of the 8–16 modulation. When the pulse width setting register change indication signal 116 is output from the CPU 1, the sequencer 303 outputs the pulse width setting register change signal 117 to a switch 306 during the space data output period. As the switch 306 is switched, the pulse width setting register, to which the sequencer 303 is referring to, is changed.

During the space data output, light is emitted at a constant space level (erase level) without performing multi-pulse emission, and therefore, there will be no effect on the light emission waveform even if the register is changed. Furthermore, by changing the register during the long space data output, the changing operation is reliably carried out.

In this embodiment, the change of pulse width setting registers 307 and 308 is performed during the long space output period, but may also have a construction in which, for example, the recording operation is forcibly interrupted temporarily and put in a reproduction mode, stopping the generation of recording pulse trains at the time of register change. Furthermore, a light emission waveform when recording on a pigment medium is shown in FIG. 3(f). In this case, there are 2 values (bias value and peak value) for the recording level.

Embodiment 2

Figure 2:
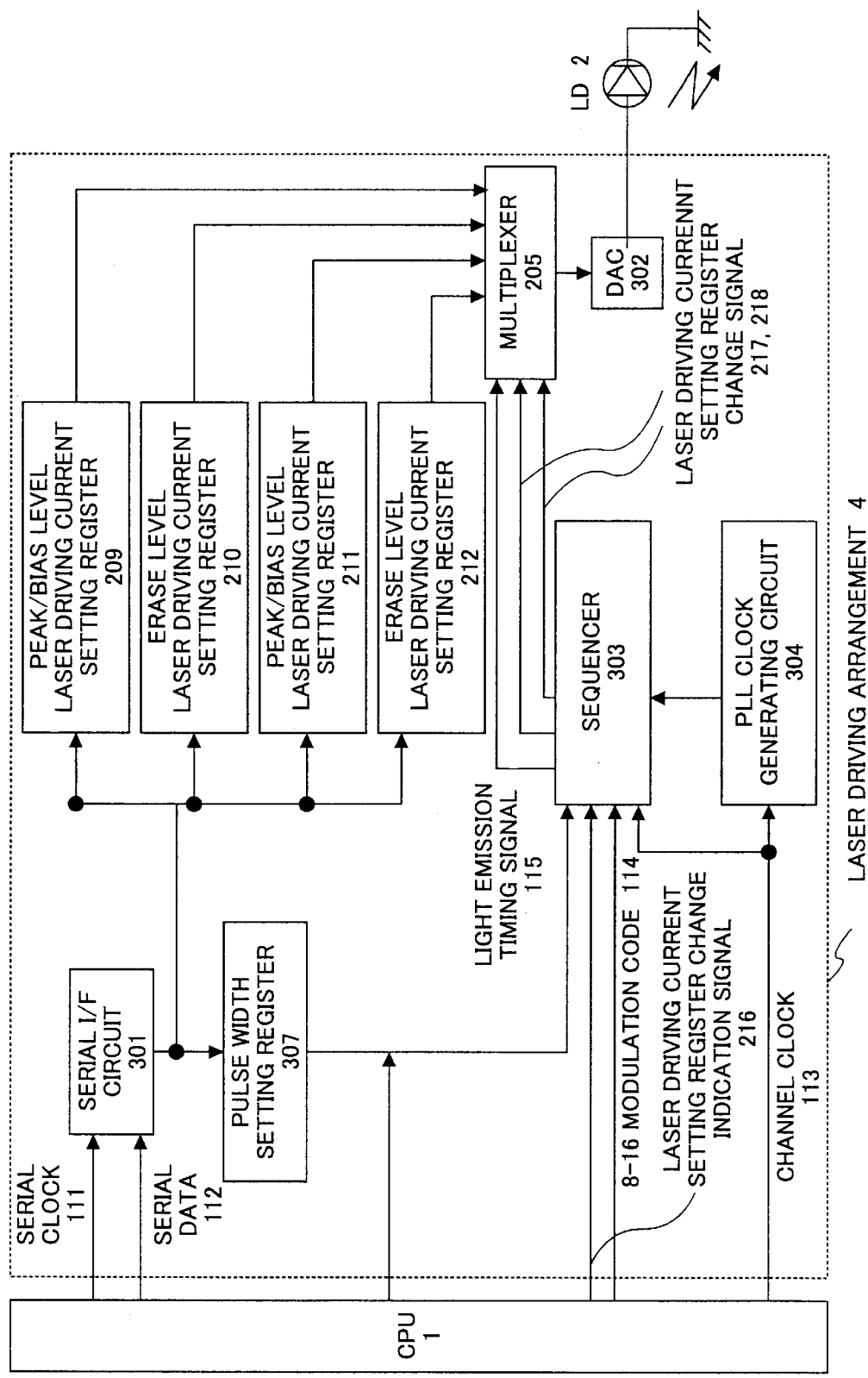
FIG. 2 is a diagram showing a control block of an optical information recording and reproducing device according to a second embodiment of the present invention.

The function of the present embodiment is explained using FIG. 2. It is to be noted that in FIG. 2, similar devices and signals with the same reference numbers as those in FIG. 1 perform similar operations.

When performing CAV type recording, besides the method of updating the multi-pulse width according to the recording linear velocity as in embodiment 1, a method of recording with optimal light emission power by updating the light emission power according to the recording linear velocity is proposed. Generally, the light emission power required to record the recording pulses are said to be proportional to the square root of the linear velocity if the duty ratio of the multi-pulse is the same. For example, if the recording linear velocity is doubled, the light emission power should be √2 times as much.

In this embodiment, 2 systems of laser driving current setting registers (209 through 212) are provided, as shown in FIG. 2, and every time the register value is updated, the registers are alternately referred to, and the register values are updated through serial communication during the non-referring period.

When forming the mark data, light is emitted at the bias level/peak level alternately because multi-pulse emission is being carried out, and when forming the space data, the light is emitted at a constant erase level. The change in the laser driving current setting registers 209 and 211 corresponding to the bias level/peak level occurs during a long space data output period, whereas the change in the laser driving current setting registers 210 and 212 corresponding to the erase level occurs during a long mark data output period. By allowing such operation, no glitches will be produced in the light emission waveform even when the laser driving current setting register is changed during the recording operation.

Figure 4:
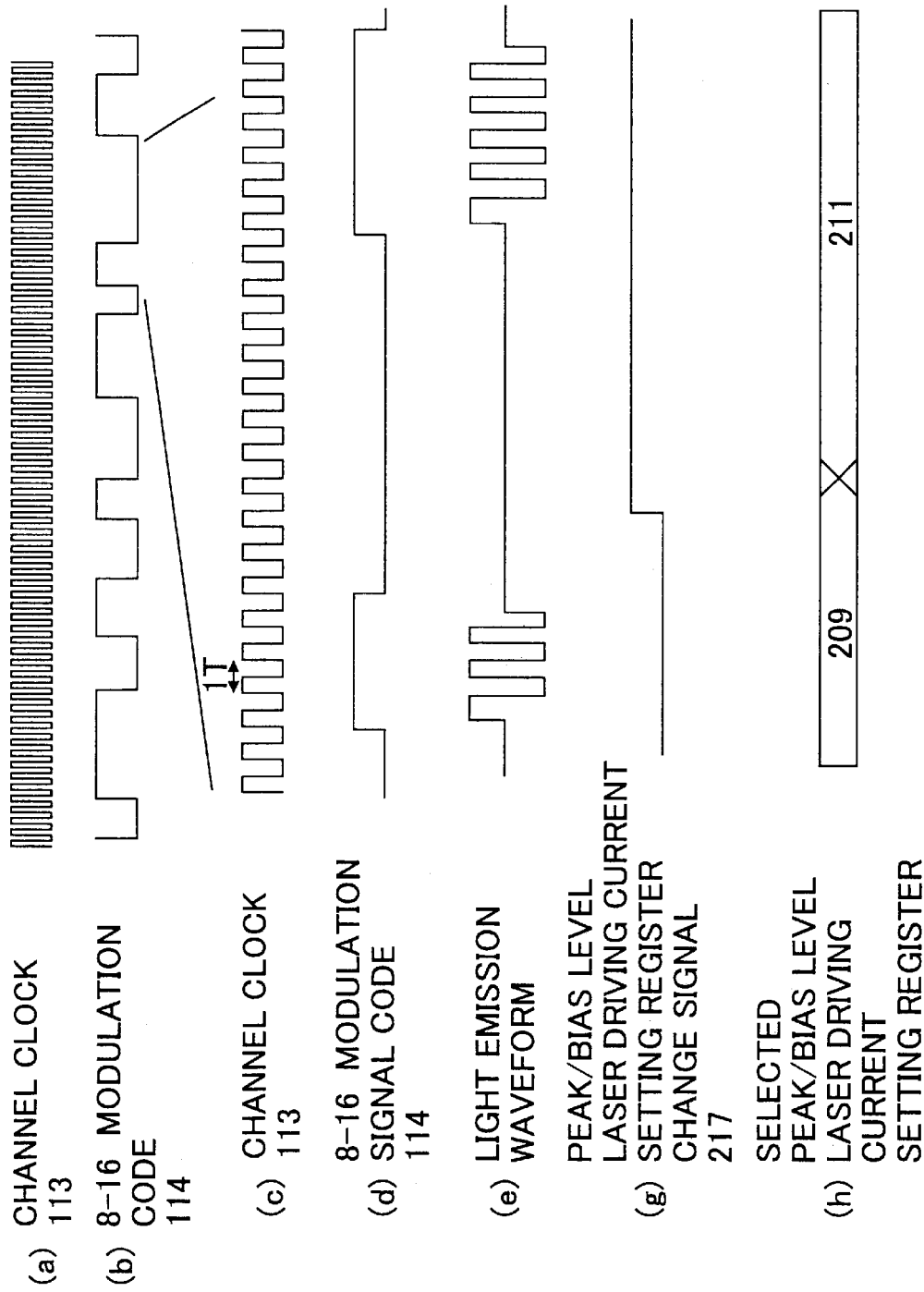
FIG. 4 is a timing chart showing the operation of FIG. 2.
Figure 5:
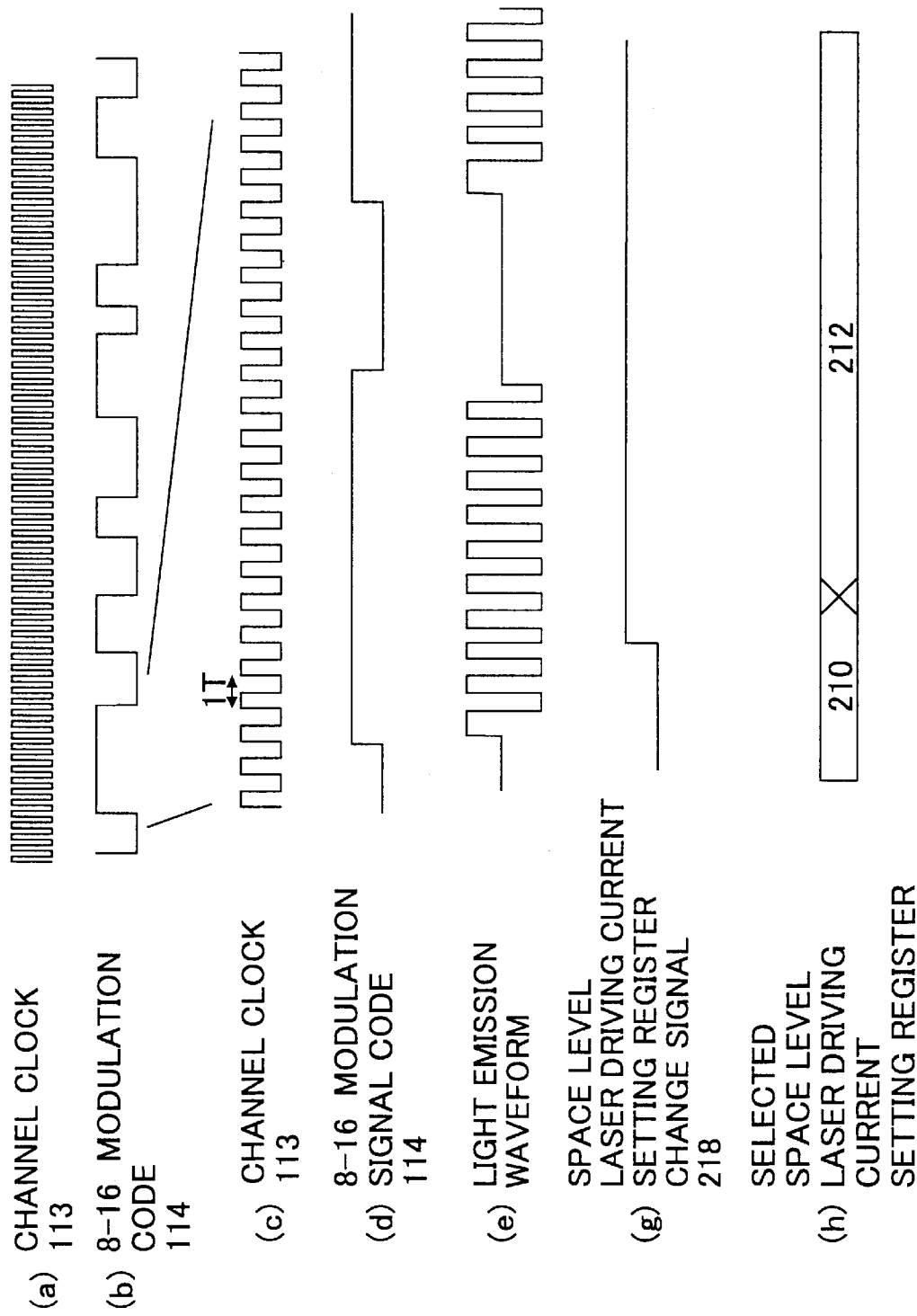
FIG. 5 is a timing chart showing another operation of FIG. 2.

As shown in FIG. 4 and FIG. 5, when the laser driving current setting register change indication signal 216 is output from the CPU 1, the sequencer 303 outputs the peak/bias level laser driving current setting register change signal 217 during the long space data output period, and the space level laser driving current setting register change signal 218 during the long mark data output period to the multiplexer 205, respectively. The multiplexer 205 changes the laser driving current setting registers 209 through 212 being referred to according to these change signals 217 and 218.

One feature of the present invention is that an optical information recording and reproducing device has a plurality of pulse width setting registers for setting pulse width of the multi-pulse emissions, and when updating the pulse width of the multi-pulse emissions, changes the pulse width setting register and then performs the recording operation.

Another feature of the present invention is that since a period for stopping the generation of recording pulse train is during the space data recording, an abnormal pulse occurrence involved in the updating of the pulse width during recording operation is prevented.

Another feature of the present invention is that by being provided with a plurality of laser driving current setting registers for setting an amount of laser driving current of each light emitting level, by changing the laser driving current setting register and then performing the recording operation when updating the amount of laser driving current, and by having a time to change the laser driving current setting register for setting the amount of current driven by light emission power for forming mark data within the space data output period, an abnormal pulse occurrence involved in updating the laser current setting during the recording operation is prevented.

Another feature of the present invention is by being provided with a plurality of laser driving current setting registers for setting an amount of laser driving current of each light emitting level, by changing the laser driving current setting register and then performing the recording operation when updating the amount of laser driving current, and by having a time to change the laser driving current setting register for setting the amount of current driven by light emission power for forming space data within the mark data output period, an abnormal pulse occurrence involved in updating the laser current setting during the recording operation is prevented.

Another feature of the present invention is that by recording, erasing, and reproducing the mark/space information on a phase change type recording medium by laser power of three values of bias level/erase level/peak level, an abnormal pulse occurrence involved in updating the pulse width setting register value during recording to the phase change type medium is prevented.

Another feature of the present invention is that because a time to change the pulse width setting register and/or the laser driving current setting register is during a recording period of longer than a predetermined length, the register change can be reliably performed.

Another feature of the present invention is that because the pulse width setting register and/or the laser driving setting register is included in a laser driving arrangement for driving the laser, high-speed data transfer is possible.

Another feature of the present invention is that because the pulse width setting register is set according to a change in the channel clock cycle, recording with an optimum optical pulse waveform is always possible even if the linear velocity of the recording changes.

Another feature of the present invention is that because recording is performed in a CAV control method at a constant rotating angular speed, recording with a high-speed data transfer rate is possible.

While the preferred form of the present invention has been described, it is to be understood that the present invention is not limited to these embodiments, and variations and modifications may be made without departing from the scope of the present invention.

What is claimed is:

1. An optical information recording and reproducing device for recording information, consisting of at least a pulse having a length of N times (N is an integer greater than or equal to 1) a channel clock cycle T, on a recording medium with a laser beam from a semiconductor laser light source based on a predetermined recording modulation method, said laser light source emitting multi-pulse emissions of a predetermined emitting rule, mark/space information being recorded and reproduced on said recording medium by laser power of at least two values of bias level/peak level;

wherein said device comprises a plurality of pulse width setting registers for setting pulse width of said multi-pulse emissions, wherein said pulse width setting register is changed and then recording operation is performed when updating said pulse width of multi-pulse emissions, and at a time of changing said pulse width setting registers during recording, recording pulse train generation is stopped.

2. An optical information recording and reproducing device as claimed in claim 1, wherein a period for stopping said recording pulse train generation is during space data recording.

3. An optical information recording and reproducing device as claimed in claim 1, wherein said mark/space information is recorded, erased, and reproduced on said recording medium by laser power of three values of bias level/erase level/peak level; said recording medium reversibly changes phase between a crystal phase and an amorphous phase.

4. An optical information recording and reproducing device as claimed in claim 1, wherein the time to change said pulse width setting register and/or said laser driving current setting register is during a recording period of data longer than a predetermined length.

5. An optical information recording and reproducing device as claimed in claim 1, wherein said pulse width setting register and/or said laser driving setting register is included in a laser driving arrangement for driving said laser.

6. An optical information recording and reproducing device as claimed in claim 1, wherein said pulse width setting register is set according to a change in said channel clock cycle.

7. An optical information recording and reproducing device as claimed in claim 1, wherein recording is performed in a CAV control method at a constant rotating angular speed.

8. An optical information recording and reproducing device for recording information, consisting of at least a pulse having a length of N times (N is an integer greater than or equal to 1) a channel clock cycle T; on a recording medium with a laser beam from a semiconductor laser light source based on a predetermined recording modulation method, said laser light source emitting multi-pulse emissions of a predetermined emitting rule, mark/space information being recorded and reproduced on said recording medium by laser power of at least two values of bias level/peak level;

wherein said device comprises a plurality of laser driving current setting registers for setting an amount of laser driving current of each light emitting level, wherein said laser driving current setting register is changed and then recording operation is performed when updating said amount of laser driving current, and a time to change said laser driving current setting registers for setting the amount of current driven by light emission power for forming mark data is within a space data output period.

9. An optical information recording and reproducing device for recording information, consisting of at least a pulse having a length of N times (N is an integer greater than or equal to 1) a channel clock cycle T on a recording medium with a laser beam from a semiconductor laser light source based on a predetermined recording modulation method, said laser light source emitting multi-pulse emissions of a predetermined emitting rule, mark/space information being recorded and reproduced on said recording medium by laser power of at least two values of bias level/peak level;

wherein said device comprises a plurality of laser driving current setting registers for setting an amount of laser driving current of each light emitting level, wherein said laser driving current setting register is changed and then recording operation is performed when updating said amount of laser driving current, and a time to change said laser driving current setting register for setting the amount of current driven by light emission power for forming space data is within a mark data output period.

* * * * *